Figure 1:
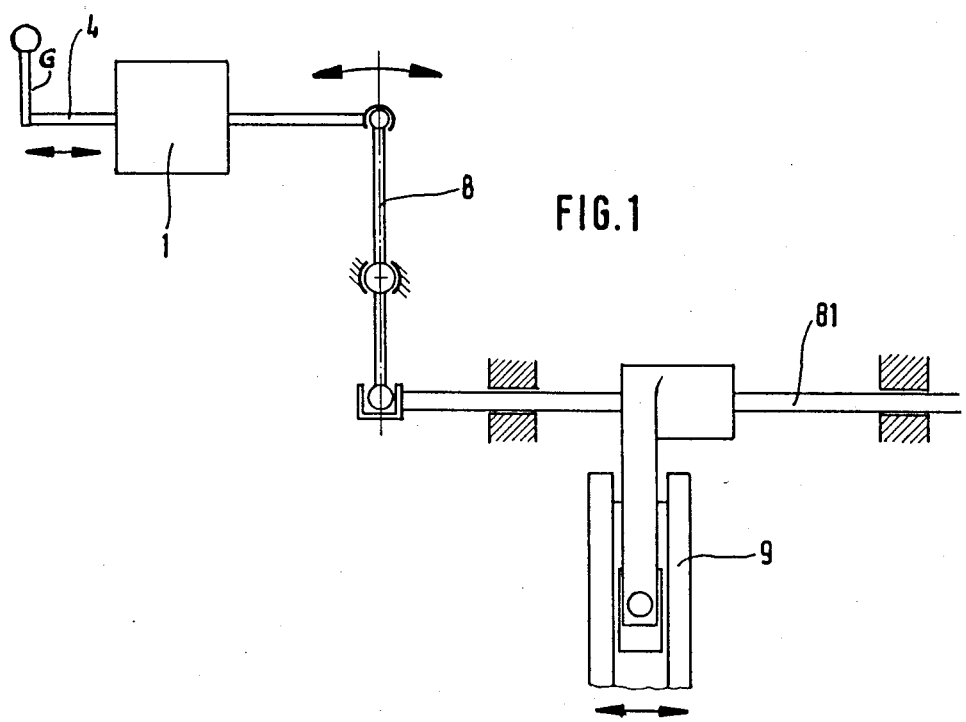

United States Patent [19]
Bieber

[11] Patent Number: 4,542,662
[45] Date of Patent: Sep. 24, 1985

[54] MECHANICAL GEAR SELECTOR

[75] Inventor: Gerold Bieber, Langenargen, Fed. Rep. of Germany

[73] Assignee: Zahnradfabrik Friedrichafen, Friedrichshafen, Fed. Rep. of Germany

[21] Appl. No.: 442,800

[22] Filed: Nov. 18, 1982

[30] Foreign Application Priority Data

Nov. 27, 1981 [DE] Fed. Rep. of Germany ....... 3147003

[51] Int. Cl.$^4$ ............................................. G05G 7/04
[52] U.S. Cl. ...................................... 74/470; 74/516; 91/376 R
[58] Field of Search ................. 91/376 R, 422, 437, 91/438; 74/388 R, 388 PS, 470, 516

[56] References Cited

U.S. PATENT DOCUMENTS

| | | | |
|---|---|---|---|
| 2,575,937 | 11/1950 | Bent | 91/376 R |
| 2,705,940 | 4/1955 | Edwards | 91/438 X |
| 2,928,378 | 3/1960 | Leduc | 91/376 R X |
| 3,148,592 | 9/1964 | Schultz et al. | 91/376 R X |
| 3,707,880 | 1/1973 | Bach | 91/376 R X |
| 3,757,640 | 9/1973 | Karol | 91/376 R X |
| 3,762,277 | 10/1973 | Paul | 91/376 R |
| 3,834,277 | 9/1974 | Yabuta et al. | 91/376 R |
| 4,089,252 | 5/1978 | Patel et al. | 91/376 R X |
| 4,319,455 | 3/1982 | Schubert | 91/373 X |
| 4,379,423 | 4/1983 | Leineweber et al. | 91/373 |

FOREIGN PATENT DOCUMENTS

| | | |
|---|---|---|
| 949142 | 9/1956 | Fed. Rep. of Germany . |
| 1961597 | 6/1971 | Fed. Rep. of Germany . |
| 1752720 | 9/1971 | Fed. Rep. of Germany . |
| 2600483 | 8/1977 | Fed. Rep. of Germany . |
| 1192379 | 7/1960 | France . |

Primary Examiner—Rodney H. Bonck
Assistant Examiner—Dwight G. Diehl
Attorney, Agent, or Firm—Hayes Davis & Soloway

[57] ABSTRACT

In a mechanical gear selector for a synchronized gear change, there is disposed an automatic force amplifier—primarily a hydrostatically operating automatic amplifier—that amplifies or amplifies the force introduced depending on the magnitude thereof, no separate energy such as a fluid pump being needed therefor, and the amplification also taking place only when needed, primarily for the synchronization of gears. Between a force input shaft and a casing disposed concentrically thereto, which casing also transmits the amplified force, there is situated in connection with an annular and a pressure space the force amplifier proper and a spring element for the defined amplification threshold. On the design depends from what input force amplification starts. From a defined amplified pressure, the amplifying action is terminated by a pressure-reducing valve so that the transmission of force is continued practically with this pressure that has been reached or a pressure therebelow.

12 Claims, 5 Drawing Figures

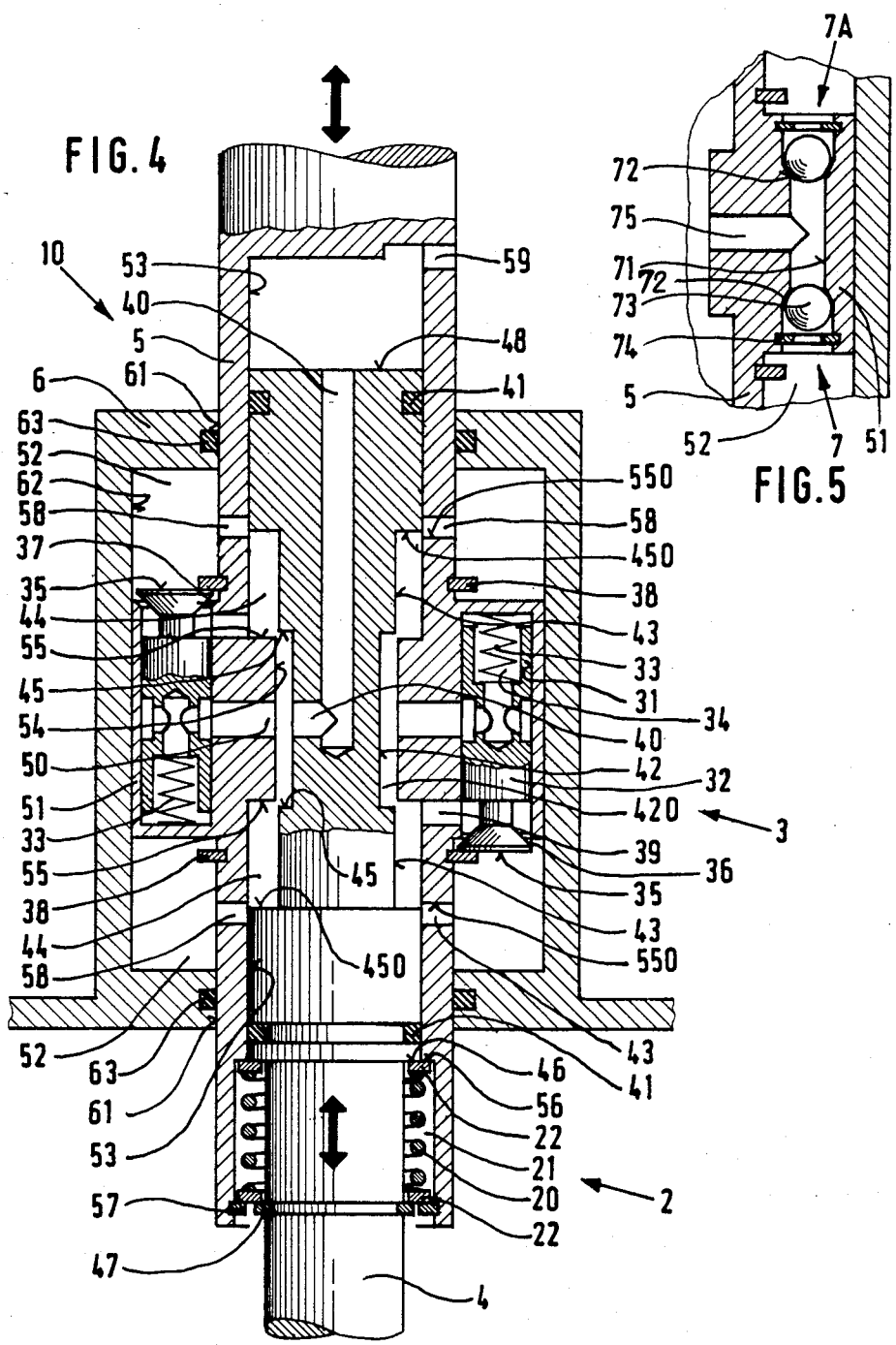

MECHANICAL GEAR SELECTOR

The invention relates to a mechanical gear selector.

Such gear selectors are known in synchronized gear transmissions by means of which the control, especially of heavy vehicle transmissions, is to be facilitated for the driver. With new larger transmissions it is no longer possible without power assistance to manually change gears due to the very large mechanical forces involved.

German Pat. No. 26 00 483, German laid-open application No. 19 61 597 and German Pat. No. 949 142 have disclosed devices for gear-changing mechanisms having an added power amplification in the gear shift, wherein the hand control power that is transmitted via a linkage from the gear-changing lever to a shift rail simultaneouslsy actuates a control valve that passes fluid, supplied by a separate fluid source, to a working piston that in turn, mostly synchronously, amplifies the manual control force spent.

Those devices function well and facilitate the control of large synchronized gear transmissions. However they require considerable capital investment and are very expensive to manufacture.

It is an object of the present invention to provide a gear selector that is substantially simpler and thus less expensive to manufacture without the manual facility being lost or reduced as a result of the servo assistance.

According to the present invention there is provided a gear selector for a synchronized gear transmission change comprising a mechanical gear change mechanism and a hydrostatic device for automatically amplifying gear change force without supply of exterior pressure, wherein said device, having an input means adapted to receive gear change force, automatically blocks the introduced force in a defined section, an output means to apply gear change force as amplified by said device, the threshold of S the amplification being controlled by a resilient element disposed between the input means and the output means.

While in the prior art there is needed, for the additional amplification of the manual gear changing force, a fluid, produced by a pump, that must be controlled by a valve device, and that is then transmitted to change gear via a working piston, in the present invention no fluid pump is required for the automatically operating force amplifier. The amplification itself takes place in a simple manner in the transmission means. While the fluid pump continuously consumes energy, even when no additional pressure is needed for the gear change force amplification—the automatic amplification renders unnecessary any additional source of energy. In an adequate design the expended hand gear change force, itself or combined with the transmission, is sufficient, and thus with this simplification there result no unfavorable effects on the quality requirements of such a gear change. Since the amplification in itself is needed not for the actual gear change, that is, for the transmission device proper, but exclusively for the short phase of the synchronizing operation, it is possible in a very simple manner to limit the action of the amplification to a certain phase of operation. It is possible without amplification to carry out a whole movement up to the reference point of the synchronization and from synchronism on until reaching desired gear meshing, and to amplify only the actual synchronizing operation. The design of the amplifier can at the same time be such that there result no disadvantages for the gear change proper, especially in connection with the easy motion on the manual gear.

If a hydrostatically operating automatic amplifier is used and a spring element is disposed before it for controlling the start of the amplification, there results in this construction an especially favorable and simple amplifying apparatus that effects the additional amplificiation starting from a previously defined input force. This amplification is upwardly limited by a pressure-reducing valve that is preferably situated in or on the hydrostatically operating automatic amplifier in order to prevent a destruction of the gear change mechanism when the driver applies high manual gear change force. Together with the already described advantages relative to the construction of the automatic amplifier, there also result simplifications for the control thereof.

With the structural construction of the present invention there is obtained a very compact and also simple hydraulic automatic amplifier. Housing the desired check valve directly in the preferred piston-collar of the casing is especially advantageous, since thereby the two check valves are coordinated with the respective pressure spaces and can be disposed in one bore. In this arrangement it is possible to use, at the same time, for the check valves, the preferred vent pipes of the pressure-reducing valves associated with the piston collar.

In an encased design of the hydrostatically operating automatic amplifier, it is possible to use the casing itself as an oil tank so that there results a device that needs relatively no maintenance.

The assembly can still be improved if the housing is accommodated in the sump of the transmission and the sump is used to contain waste oil. If the casing is at the same time supported in the transmission housing itself, a still more extensive simplification results.

Figure 2:
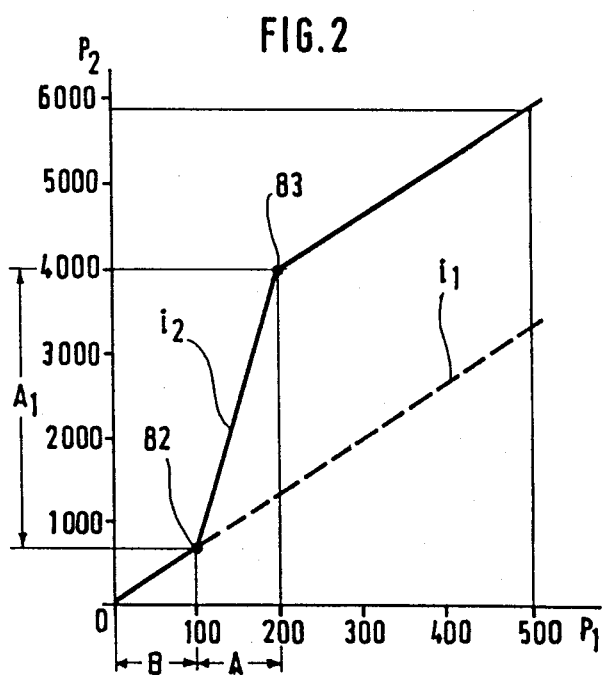
Figure 3:
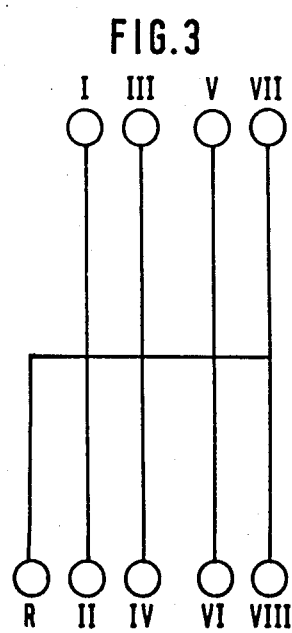

The invention will now be described, by way of example, with reference to the accompanying drawings, in which:

FIG. 1 is a transmission device for the gear selector;
FIG. 2 is a gear change force diagram;
FIG. 3 is a gear change diagram;
FIG. 4 is a hydrostatic automatic amplifier having a defined force amplificaton;
FIG. 5 is a check valve assembly.

FIG. 1 shows a mechanically amplified gear selector having a shaft 4 that transmits the manual gear change force from the gear change lever G both for the selection and for the changing movements. Such gear changing movements primarily take place on movement of the gear change lever itself via transmission lever 8, and are transmitted for changing the gears via gear shift rods 81 to clutch sleeves 9 of mostly double-gear couplings. For synchronizing in modern very heavy gears, the gear changing force of the driver is no longer sufficient. To overcome this problem force amplifier 1, comprising mainly a hydrostatic automatic amplifier 10 (i.e., without auxiliary energy) is coupled in the gear shift mechanism.

In the diagram according to FIG. 2, the clutch sleeve force P2 is applied in dependence on manual gear change force P1. The normal gear shift transmission acts in the area B of the manual gear change force up to the reference point 82 without amplification. In the area A for the normally transmitted manual gear change force and $A_1$ for the resulting clutch sleeve force, the amplification increases from zero up to the terminal point 83, i.e., the limitation by pressure-reducing valve. The amplifying factor of the amplification remains constant thereafter. This additional amplification, therefore, acts as a rule only in the area of the synchronization. If no amplification is needed, for instance, after the synchronism point and until the gears are engaged, the force amplifier is brought to a non-amplifying condition (area B from 0 to the reference point 82) by operation of compression spring 20. The oil under pressure that may be required is sucked back via a check valve.

FIG. 3 shows a possible gear change diagram on the gear-shift lever, for instance, a double-H. The amplification operates only in connection with the synchronization in switch lever movement within a lane, for instance, speed I to II or VII and VIII, but not for the lane selection-horizontal movement.

FIG. 4 shows a hydrostatically operating automatic amplifier 10 with a housing 6, which also is primarily the gear housing, having a bore 61 and a cylinder 62. In the bore 61 is longitudinally movably supported and sealed by a seal 63 to a sleeve 5, which is connected via at least one gear change rod 81 with a clutch sleeve 9 (FIG. 1). The sleeve 5 has a collar that forms a piston 51 in the cylinder 62 and which, in the neutral position (as shown), forms with the housing 6 and the sleeve 5 two equally sized pressure spaces 52.

In a bore 53 of the sleeve 5 is supported and sealed, by seal 41, a shaft 4, which on either side of a deep annular recess 42 has two less deep annular recesses 43 of equal depth that in combination with an inwardly extending annular collar 54 of the sleeve 5 form two annular spaces 44 and coordinated with each annular space two leading edges 45, 55. On the input side of the normally amplified manual gear change force (bottom in the drawing) there is inserted between an annular face 56 and stop rings 47, 57 (on the shaft 4 and on the casing 5) two rings 22, a compression spring 20 that holds the shaft against stop 57 when in a neutral position is maintained under an initial compression. On the opposite end 48 of the shaft 4 there is between the latter and a closed end of the casing 5, a free space, the axial reach of which corresponds at least to the possible relative motion between shaft and sleeve. This space has an opening 59 to an oil container or to the sump of the transmission.

In the collar-like piston 51 of the casing 5 there is also coordinated with each pressure space 52 a pressure-reducing valve 3 and a check valve 7(see FIG. 5). The pressure-reducing valve 3 comprises an axially disposed bore 31 in which a piston 32 is held in the open position by spring 33. The spring space 34 is connected in all positions of the piston 32 with, for example, the transmission sump via conduits 50 in the sleeve 5 and 40 in the shaft 4. Opposite the spring 33 there is also disposed on the piston 32 a piston surface 35 having an inwardly oriented frusto-conical surface 36 that mates with a sealing surface 37 on the bore 31, the piston being retained in its open position by spring (33) and by a stop (38). In its closed position the valve seals the connection (39) between annular space 44 and pressure space 52. In the area of the two recesses of equal depth, between the respective annular space 44 and the coordinated pressure space 52, openlngs 58 are disposed so as to make possible in the neutral position a pressure compensation between the two spaces, and to cause said openings to become sealed by the leading edge 450 upon a movement of the shaft 4 relative to the sleeve.

According to FIG. 5, in the piston 51 of the sleeve 5 is disposed a bore 71 having a ball seat 72 and a sealing ball 73 held captive by ring 74. The bore also has a connection 75 that leads into the cavity 420.

The hydrostatically operating automatic amplifier 10 operates as follows:

The gear change motion and gear change force of the gear change lever is introduced in the apparatus, for example, according to FIG. 4, via adequate transmission means, over the shaft 4. This force is counteracted by means of the prestressed spring 20 and the ring 22 and by means of the two collars 46 and 56 and of the stop rings 47 and 57 in a manner such that the shaft 4 and the casing 5 are held in the neutral position. Only when a predetermined force is exceeded which exceeds the prestressing of the spring 20, is a movement of the shaft 4 relative to the sleeve 5 possible in either direction (see arrows in FIG. 4). Then the pressures in the two pressure spaces 52 can compensate themselves according to the direction of movement via the openings 58, annular spaces 44 and the cavity 420. At the same time there also exists an additional communication via the conduits 40 and the connection 59, for instance, to the sump of the gearing.

If the gear change force exceeds the spring initial stress, the leading edges 450 close the openings 58 to the coordinated pressure space 52. At the same time, the pressure compensation on the casing via the cavity 420 is stopped by the leading edge 45 combined with the leading edge 55. Accordingly, the ventilation both of the pressure space 52 and of the annular space 44 is maintained on the inactive opposite side. The pressure that now forms in the annular space 44 balances itself via the connection 39 with the pressure space 52. During this phase of the movement of the shaft 4 relative to the casing 5, the transmission takes place according to the following formula so that the following gear change force results:

$$P_2 = \left( \frac{(P_1 - P_F) \cdot F_5}{F_4} \right)^{+PF}$$

wherein $P_1$ is the introduced gear change force, $F_5$ is the piston surface area on the sleeve 5 in the area of the pressure space 52, $F_4$ is the piston surface area in the area of the annular space 44, and $P_F$ is the spring tension. Since this force amplification takes place during the synchronization phase, the gear change movement transmission ratio is unchanged because movement is very small during the synchronization step. After reaching a pressure determined by the initial tension of the spring 33 in the pressure-reducing valve 3, the pressure-reducing valve 3 is closed so that the fluid enclosed in the annular space 44 takes care of a synchronous axial movement of the casing 5 with the shaft 4. Since after reaching th.e synchronism no significant gear change resistance results, there occurs no further increase of the gear change force on the clutch sleeve. If the force applied to the shaft 4 is in this connection less than the spring elasticity of the pressure spring 20, then the latter brings the casing 5 back to the median position. The oil lost then by waste is refilled by the check valves 7, 7A from the oil container, primarily the sump of the gearing.

The synchronism point is preferably in the A, $A_1$ area, but it can be past the terminal point 83 of the amplification as the result of a very high hand gear change force.

The above description has been concerned with a force applied on input shaft 4 in only one (e.g. up) direction. The same result occurs when the gear shifting force is applied in the opposite direction, the spring 20 being compressed downwardly to allow the axial movement of the shaft 4 in sleeve 5 to take place. This will close passage 420 and transmit hydraulic pressure to the upper pressure space 52 causing piston 51 to move downwardly.

As has been explained, this mechanical transmission device does not have to be used exclusively in a gear change selector in both moving directions; it can also be used very advantageously and more simply in transmissions and amplifications in only one direction, in gear changes and other transmission devices.

I claim:

1. A gear selector for a synchronized gear transmission change comprising a mechanical gear change mechanism and a hydrostatic device, said device including an input means adapted to receive a gear change force, an output means to apply a gear change force to said gear change mechanism, a force amplifying means operable to couple said input means to said output means to increase said gear change force received by said input means without supply of exterior pressure, and a resilient element disposed between the input means and output means for controlling the threshold gear change force at which said force amplifying means becomes operable.

2. A gear selector according to claim 1, wherein a pessure-reducing valve for limiting said increase is disposed in said device.

3. a gear selector according to claim 1, wherein said device comprises an axially movable input shaft, forming part of the input means and adapted to be connected to a gear change lever, said shaft extending into a bore in a sleeve, forming a part of the output means and being disposed concentrically with the shaft, the resilent element being disposed between said shaft and said sleeve and comprising a compression spring, Said sleeve being axially movable in a cylinder formed in a housing, said sleeve having an annular band forming a piston in sliding engagement with said cylinder.

4. The gear selector of claim 3 wherein the cylinder and pistion cooperate to form two annular spaces on either side of said pistion.

5. The gear selector of claim 3 wherein a predetermined compression of said spring creates a hydraulic force which is transmitted to said piston to create an increased force on said sleeve and said output.

6. The gear selector of claim 3 wherein a predetermined motion of said input shaft with respect to said sleeve operates to close a passage communicating with an annular space adjacent said piston and the exterior thereof and further motion of said input shaft increases the hydraulic pressure in said space.

7. The gear selector of claim 3 wherein said shaft and said sleeve have cooperating valve surfaces which are opened or closed depending upon the axial relationship between the shaft and the sleeve.

8. The gear selector of claim 6 wherein said shaft acts as a pistion in a cylinder in the sleeve having a first predetermined cross sectioned area, the cross sectioned area of the piston associated with said sleeve being of a substantially larger area to give a force increase.

9. The gear selector of claim 6 which additionally includes a valve means for limiting the upper pressure limit in the annular space.

10. The gear selector of claim 9 wherein said valve means is carried by said sleeve and is associated with a passage extending from a space adjacent the interior of said sleeve and the exterior of said sleeve.

11. The gear selector of claim 4 wherein for each annular piston space there is at least one pressure-reducing valve each comprising a bore and cooperating with a piston supported onto one end of said bore by a compression spring and having a defined piston surface at the other end that interacts with a sealing surface on one end of said bore, the cooperating piston being held in its closed position by stops in said annular spaces shutting off a connection to said annular space.

12. A gear selector according to claim 11, wherein there are also disposed two check valves, each said check valve comprising an axially extending bore provided with a ball seat and an axially captive sealing ball.

* * * * *